(12) United States Patent
Winger et al.

(10) Patent No.: US 7,596,239 B2
(45) Date of Patent: Sep. 29, 2009

(54) METHOD AND/OR APPARATUS FOR VIDEO WATERMARKING AND STEGANOGRAPHY USING SIMULATED FILM GRAIN

(75) Inventors: Lowell L. Winger, Waterloo (CA); Eric C. Pearson, Conestogo (CA)

(73) Assignee: LSI Corporation, Milpitas, CA (US)

( * ) Notice: Subject to any disclaimer, the term of this patent is extended or adjusted under 35 U.S.C. 154(b) by 446 days.

(21) Appl. No.: 11/195,048

(22) Filed: Aug. 2, 2005

(65) Prior Publication Data
US 2007/0030996 A1    Feb. 8, 2007

(51) Int. Cl.
*G06K 9/00*    (2006.01)
(52) U.S. Cl. .................. 382/100; 382/232; 380/201; 380/203
(58) Field of Classification Search ............. 382/100, 382/232; 380/201, 203
See application file for complete search history.

(56) References Cited

U.S. PATENT DOCUMENTS

| | | | |
|---|---|---|---|
| 6,449,380 B1 * | 9/2002 | Acharya et al. ............. | 382/100 |
| 2002/0106103 A1 * | 8/2002 | Jones et al. ................ | 382/100 |
| 2005/0258256 A1 * | 11/2005 | Jones et al. ................ | 235/494 |
| 2005/0259820 A1 * | 11/2005 | Jones ........................ | 380/201 |
| 2006/0133686 A1 * | 6/2006 | Gomila et al. .............. | 382/232 |
| 2006/0215767 A1 * | 9/2006 | Gomila et al. .............. | 382/254 |
| 2006/0256873 A1 * | 11/2006 | Gomila et al. ......... | 375/240.29 |
| 2006/0292837 A1 * | 12/2006 | Gomila et al. .............. | 438/488 |
| 2007/0070241 A1 * | 3/2007 | Boyce et al. ................ | 382/128 |
| 2007/0104380 A1 * | 5/2007 | Gomila et al. .............. | 382/239 |
| 2007/0117291 A1 | 5/2007 | Cooper et al. | |

FOREIGN PATENT DOCUMENTS

WO    WO 2004/095829 A1 *    11/2004

\* cited by examiner

*Primary Examiner*—Vikkram Bali
*Assistant Examiner*—Daniel Zeilberger
(74) *Attorney, Agent, or Firm*—Christopher P. Maiorana, PC

(57) ABSTRACT

An apparatus comprising a first circuit, a second circuit, and a watermark detection circuit. The first circuit may be configured to generate a bitstream, wherein the bitstream comprises a watermark message which represents hidden information. The second circuit may be configured to (i) simulate film grain in response to one or more predetermined values on the watermark message and (ii) generate a video output. The watermark detection circuit may be configured to extract hidden information from the decoded video output.

28 Claims, 3 Drawing Sheets

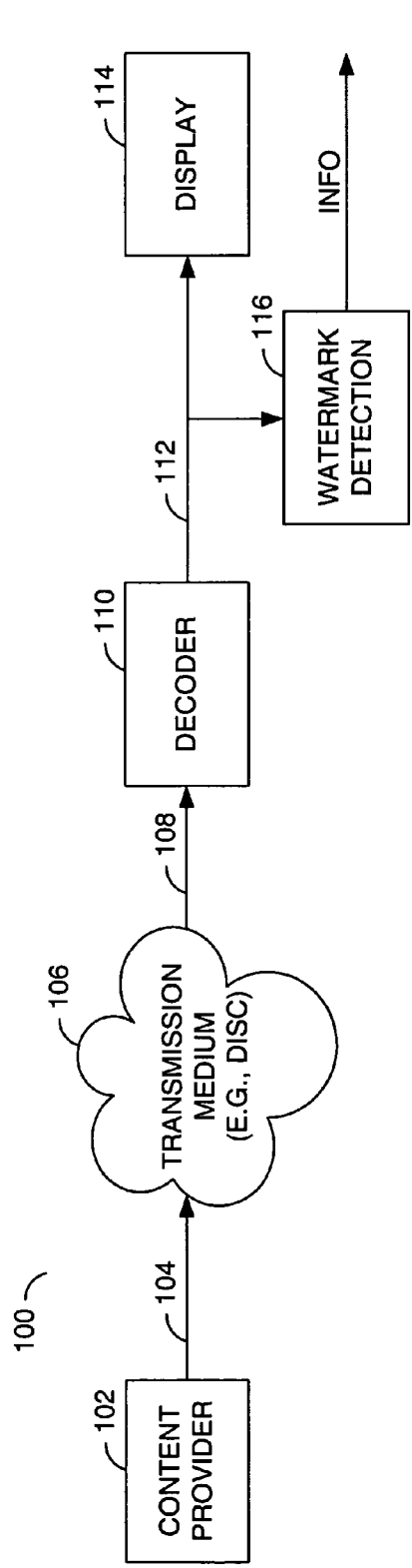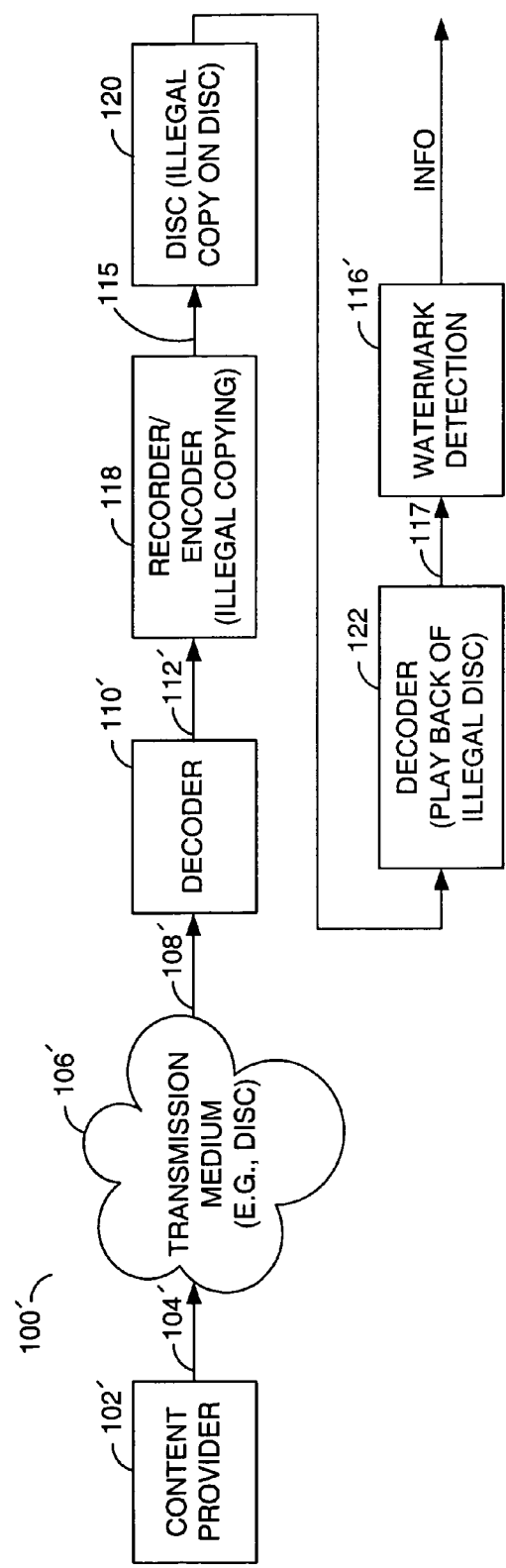

US 7,596,239 B2

METHOD AND/OR APPARATUS FOR VIDEO WATERMARKING AND STEGANOGRAPHY USING SIMULATED FILM GRAIN

FIELD OF THE INVENTION

The present invention relates to copy protection generally and, more particularly, to a method and/or apparatus for video watermarking and steganography using simulated film grain.

BACKGROUND OF THE INVENTION

Watermarking and data hiding have been extensively researched (e.g., IEEE ICIP, ISCAS, ICMCS, ICASSP, and SPIE special sessions and conferences for the past two decades). Due to the significant broadband consumer electronics applications, such watermarking provides an underlying enabling technology for digital rights management, steganography, watermarking, copy protection, copyright protection, traitor tracing, and/or IP protection.

Conventional watermarking extraction techniques include (i) taking a large number (e.g., 1000) of the highest amplitude discrete cosine transform (DCT) coefficients in an image (or video frame), (ii) averaging 8×8 blocks of an image (essentially the equivalent to taking the DC 8×8 transform coefficients), (iii) subtracting the original copy and projecting the remaining copy onto a subspace, and (iv) finding salient points and Delaunay triangulating the salient points for representation as a graph.

Among conventional watermarking extraction techniques, working directly on a compressed video stream is effective computationally. Inserting a robust watermark into a compressed video stream involves subtle manipulation of standard high bitrate syntax elements of a stream. Information may be directly inserted into a video in the pixel domain prior to compression. However, by inserting video in the pixel domain prior to compression, a much higher data processing rate (typically 50 to 100 times higher) is needed. A compression process that follows inserting video in the pixel domain is inefficient since the information quality weakens. It is computationally efficient to insert the information into the compressed stream after all easily accessible sources of redundancy have been removed from the data.

Typically, when the bitrate is high and the syntax element that is in use includes less perceptually visible distortion, more information can be inserted into the compressed stream. This approach has led to the preference shown in the past towards inserting information into transform coefficients, particularly the low-frequency (the lowest frequency of which is the DC coefficients).

Conventional approaches including using transform coefficients that are quite complex and need processing of the majority of an entire compressed bitstream to effectively insert information. In addition, with conventional approaches, robustness, security, and imperceptibility could be improved.

Watermark/fingerprint insertion and extraction processes are computationally demanding. Watermarks and fingerprints inserted for traitor tracing should be robust, secure, and imperceptible and should not be removable without distorting the video. Conventional approaches mainly differ from each other by the models used to control fidelity, robustness, bitrate, and error rates.

It would be desirable to provide a method and/or apparatus for video watermarking and steganography that improves robustness, security, and imperceptibility of the watermarking insertion and extraction process.

SUMMARY OF THE INVENTION

The present invention concerns an apparatus comprising a first circuit, a second circuit, and a watermark detection circuit. The first circuit may be configured to generate a bitstream. The bitstream may comprise compressed video data and a watermark message which represents hidden information. The second circuit may be configured to (i) simulate film grain in response to one or more predetermined values on the watermark message and (ii) generate a video output. The watermark detection circuit may be configured to extract hidden information from the video output.

The objects, features and advantages of the present invention include providing a method and/or apparatus for video watermarking and steganography using simulated film grain that may (i) lower the complexity of watermark insertion, (ii) add a minimized bitrate to a compressed bitstream (e.g., that is extremely efficient) and/or (iii) remain competitive with other methods.

BRIEF DESCRIPTION OF THE DRAWINGS

These and other objects, features and advantages of the present invention will be apparent from the following detailed description and the appended claims and drawings in which:

FIG. 1 is a block diagram illustrating various components of video watermarking using simulated film grain in accordance with a preferred embodiment of the present invention;

FIG. 2 is a block diagram illustrating various components of video watermarking using simulated film grain in accordance with a preferred embodiment of the present invention;

DETAILED DESCRIPTION OF THE PREFERRED EMBODIMENTS

Figure 3:
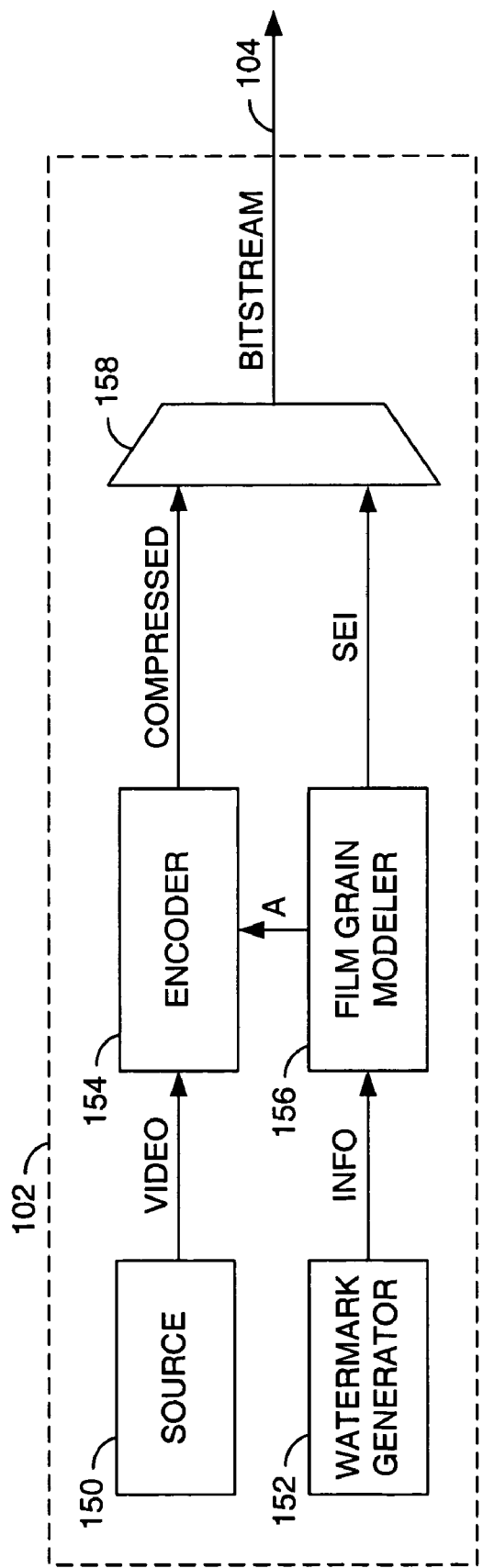
FIG. 3 is a more detailed block diagram illustrating an example content provider in accordance with a preferred embodiment of the present invention.

Simulated film grain may be represented by extremely efficient syntax as described in H.264/MPEG4-AVC and "Film Grain Simulation for HD DVD Systems" by SMPTE, published Nov. 22, 2004, version 2, which is hereby incorporated by reference in its entirety. A high bitrate portion of a compressed video data stream may be modified (e.g., the film grain) by manipulating an extremely small portion of the video syntax. The leverage that is now available through simulated film grain may be effectively exploited for watermarking and/or fingerprinting. Simulated film grain may provide characteristics that are ideal for watermarking and/or fingerprinting applications.

Film grain is very visible and is specified in a bit-accurate way as described in "The Film Grain Technology Specification" by SMPTE, published May 6, 2005 as a registered design document (RDD), version 1.0, which is hereby incorporated by reference in its entirety. Generally, any modification to the film grain characteristic is easily detectible. The film grain syntax permits specifying unique film grain characteristics on a picture-by-picture basis. Information may be embedded not only within the frequency and correlation characteristics of the specified film grain, but also within the temporal variation in the film grain patterns.

Typically, the rendered data rate of the film grain portion of decompressed video is extremely high. The effective compression ratio of the compressed simulated film grain may be many orders of magnitude higher than that of the underlying video sequence from which film grain has been removed through pre-processing. Generally, the film grain syntax is substantially more 'leveraged' than any other bitstream syntax elements.

Referring to FIG. 1, a block diagram of a system 100 in accordance with a preferred embodiment of the present invention is shown. The system 100 generally comprises a block (or circuit) 102, a block (or circuit) 106, a block (or circuit) 110, a block (or circuit) 114, and a block (or circuit) 116. The block 102 may be implemented as a content provider. The block 106 may be implemented as a transmission medium (or disc). The block 110 may be implemented as a decoder. The block 114 may be implemented as a display. The block 116 may be implemented as a watermark detection circuit. In general, the content provider 102 presents video image data, audio data or other data that is compressed and transmitted in a bitstream 104 to an input of the transmission medium 106. The video image, audio and/or other data (e.g., a sequence of still images, etc.) in the data bitstream 104 generally comprises an encoded video or audio signal and a watermark. The encoded data on the bitstream 104 may be encoded by one or more encoding standards (e.g., MPEG-1, MPEG-2, MPEG-4, WMV, VC-9, VC-1, H.262, H.263, H.264/JVC/AVC/MPEG-4 part 10, AVS 1.0', Real Networks, DIVX Networks, and any other open or proprietary methods for compression of audio-video data). The transmission medium 106 generally presents the compressed data stream 108 to an input of the decoder 110.

In one example, the content provider 102 may comprise a video broadcast, DVD, or any other source of video data stream. The transmission medium 106 may comprise, for example, a broadcast, cable, satellite, or data network, a DVD, a hard drive, or any other medium implemented to carry, transfer, and/or store a compressed bit stream. In one example, the decoder 110 may be implemented as a separate system. The decoder 110 generally decompresses (decodes) the data bit stream and presents the data via a link 112 to the display 114. The decoder 110 may also simulate a film grain in response to decoding the watermark. The watermark detection circuit 116 may extract the watermark from the simulated film grain. The watermark detection circuit 116 may be used for forensic (or other) purposes.

Referring to FIG. 2, a block diagram of a system 100' is shown in accordance with another embodiment of the present invention. A recorder 118 may encode the decompressed video output which includes the watermark. The recorder 118 may produce a bitstream on an output 115. The recorder 118 may record the video output to produce an illegal (e.g., unlicensed) copy of the video. The illegal copy of the video may be saved to a disc 120. A decoder 110' generally provides simulated film grain with the watermark. The watermark detection circuit 116' may extract the watermark from the disc 120. The watermark may identify the disc (e.g., transmission medium 106'), the device and/or a playback session where the illegal copy originated. The watermark detection circuit 116' may identify the disc 120 and/or playback session on a signal (e.g., INFO).

Generally, the video image may be encoded by the content provider 102' with the watermark, stored on the transmission medium 106' and sent to a user. The bitstream may be decoded by the decoder 110' and presented as video, which may be presented to the display 114. The output may also be presented to the recorder/encoder 118 where the user may perform illegal copying in contradiction to the rights of the owner of the work. From there, the disc 120 (or discs) may be distributed illegally. The decoder 122 may provide simulated film grain with the watermark. Later, the watermark may be extracted by the watermark detection circuit 116' from the raw video of an illegally distributed copy 120 to identify the distributed disc, and to ban the misbehaving user.

The system 100' may be adapted to the following example. A studio may create and distribute secure recordings for pre-release screening of Hollywood films. Generally, in addition to encryption, watermarking is necessary for security. Forensically-traceable watermarks are needed on all video outputs to identify which distributed copy was pirated. Also, it may be desirable to determine where the pirated copy was played.

The video image may be encoded by the content provider 102' (optionally with a watermark) to identify the individual disc (or transmission medium 106'). The disc 106' may be sent to a user. The user may decode the video image from the disc 106' with the decoder 110'. The decoder 110' may be a secure device which (i) modifies (or generates) the film grain from the original given by the content provider 102' and (ii) indicates in the watermark and which playback session the particular output video was generated from (e.g., the time/date/player-id-number and conditional access module id number). The disc 120 may be copied illegally (e.g., a camcorder in a studio, or an analog copy taken of the video signal). The watermark may be extracted from the illegal copy 120 (e.g., by LSI or the FBI) with the watermark detection circuit 116' to identify not only the disc/transmission, but also which device(s) and playback session(s) the copy came from.

The current HD-DVD standard discloses that each video frame needs to be checked for bit-accuracy at the decoder 122 by a CRC (cyclical redundancy code). The system 100' needs to include a mechanism to get an exact measure of the decoded video (e.g., the CRC) for verification of bit-accuracy. In one example, a DVD player manufacturer could use a similar mechanism (e.g., a serial port on an HD-DVD player box, or possibly a firewire, SATA, or PCI bus) to present the extracted watermark information for whatever purpose the manufacturer chooses. In one example, a watermark detection system may be a DVD-player which may playback the pirated copy and extract the watermark information (e.g., session and disc origin of information for the recording).

Referring to FIG. 3, a more detailed block diagram is shown illustrating an example implementation of the content provider 102 in FIG. 1. The content provider 102 generally comprises a block (or circuit) 150, a block (or circuit) 152, a block (or circuit) 154, a block (or circuit) 156 and a block (or circuit) 160. The block 152 may be implemented as a watermark generator. The watermark generator 152 may produce watermarks (or hidden information). The block 154 may be implemented as an encoder. The block 156 may be implemented as a film grain modeler circuit. The block 158 may be implemented as a multiplexer. The source 150 may present a signal (e.g., VIDEO) to the encoder 154. The encoder 154 may present a signal (e.g., COMPRESSED) to the multiplexer 158. The watermark generator 152 may present the signal INFO to the film grain modeler circuit 154. The film grain modeler circuit 156 may present a signal (e.g., SEI) to the multiplexer 158. The film grain modeler circuit 156 may present a signal (e.g., A) to the encoder 154. The signal SEI may comprise one or more syntax elements. The multiplexer 160 may present a signal (e.g., BITSTREAM).

In general, the content provider 102 may embed watermarks into the compressed bitstream using simulated film grain syntax. The content provider 102 may embed the watermarks in the bitstream with temporal and/or spatial characteristics of the film grain. The content provider 102 generally manipulates film grain intensity and film grain pattern (e.g., size and shape) by using film grain that is characterized by a frequency filtering type and inserted with additive blending. The watermark may be embedded by manipulating various parameters of a H.264/MPEG4-AVC Film Grain Supplemental Enhancement Information (SEI) message. The parameters of the SEI message (or watermark message) generally comprises a parameter log2_scale_factor and a parameter comp_model_value (e.g., film grain intensity in the different color bands and vertical and horizontal high cut frequency of the film grain).

In one example, the content provider 102 may present a watermark that may be independent of the original video provided by the source 150. The film grain modeler 156 generates the signal SEI in response to receiving the watermark. The signal SEI may include various parameters of the SEI message. The parameter of the SEI message may vary depending on the watermark. The film grain modeler 156 may present the signal SEI to the multiplexer 158.

In one example, the content provider 102 may present a watermark that may be dependent on the video and/or audio generated by the source 150 (e.g., embedded into the original video/audio). Generally, the film grain modeler 156 may be modified to insert the watermark generated by the watermark generator 152. The watermark generator 152 may present the watermark on the signal A to the encoder 154. The encoder 154 may generate the core film grain model with the original video/audio and the watermark. The encoder 154 may (i) estimate the original film grain generated by the original input source 150, (ii) remove the original film grain, (iii) model the SEI message and (iv) produce a compact bitstream so that the original film grain may be reinserted by a decoder to emulate the original video film grain appearance. The signal COMPRESSED generally comprises compressed video/audio data and the SEI message.

The multiplexer 158 may present the embedded watermark and compressed video data (e.g., via the signal COMPRESSED) on the signal BITSTREAM if the watermark is dependent on original video/audio (or original video). The multiplexer 158 may present the watermark (e.g., via the signal SEI) on the signal BITSTREAM if the watermark is independent of the original video.

The syntax elements on the signal COMPRESSED and/or the signal SEI may be manipulated at a multiple of picture frequencies. The parameters of the SEI message are generally compliant with the ITU-T Rec. H.264/ISO/IEC 14496-10 standard. In general, the syntax elements may be generated by adjusting the following parameters of the SEI message: (i) log scale_factor, (ii) comp_mode_value[c] [i] [0], (iii) comp_model_value[c] [i] [1] and (iv) comp_model_value[c] [i] [2]. The parameter log_scale_factor generally specifies the logarithmic scale factor which is used to represent the film grain parameter in the SEI message. The parameter log_scale_factor may generally be in the range [2,7] to ensure the film grain simulator (e.g., to ensure the film grain simulation process may be performed by using 16-bit arithmetic). The parameter comp_model_value[c] [i] [0] generally specifies a film grain intensity for a color component c and an intensity interval i. Generally for all values c and i, the parameter comp_model_value[c] [i] [0] may be in the range [0,255] to ensure the film grain simulation may be performed using 16-bit arithmetic. The parameter comp_model_value[c] [i] [1] generally specifies the horizontal high cut frequency that characterizes a film grain shape for the color component C and the intensity interval i. Generally for all values c and i, the parameter comp_model_value [c] [i] [2] may be in the range [2,14] which generally includes all of the needed grain patterns. The parameter comp_model_value[c] [i] [2] generally specifies the vertical high cut frequency that characterizes the film grain shape for the color component c and the intensity interval i. For all values c and i, the parameter comp_model_value [c] [i] [2] may be in the range [2,14] which generally includes all of the needed grain patterns.

Each of the parameters log2_scale_factor, comp_model_value[c] [i] [0], comp_model_value[c] [i] [1], the comp_model_value[c] [i] [2] may be manipulated to present watermarking information generated by the watermark generator 152. The SEI message comprises a parameter model_id and a parameter blending_mode_id. The parameter model_id may be set to 0 to identify that the film grain simulation model as frequency filtering. The parameter blending_mode_id may be set to 0 to indicate an additive blending mode to blend the simulated film grain with the decoded frame.

Figure 4:
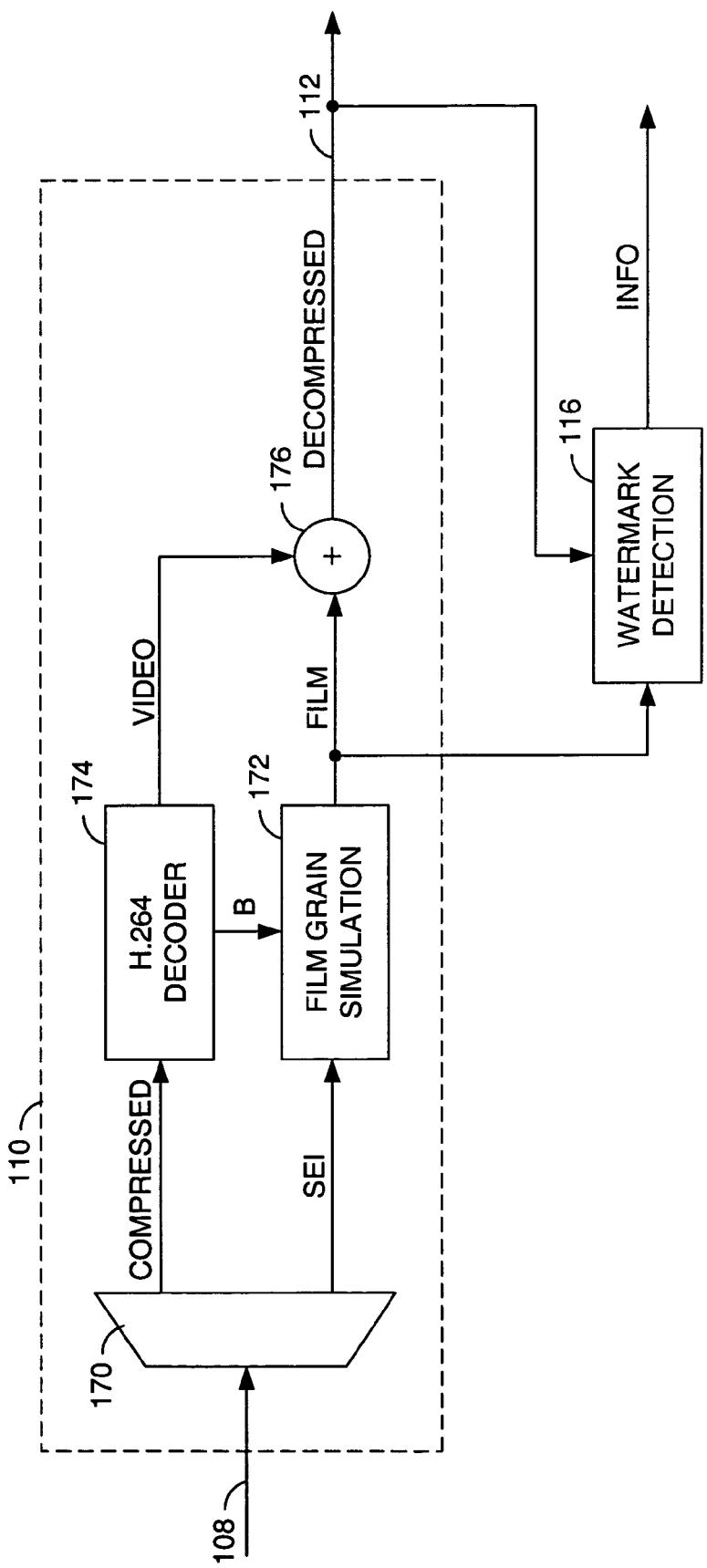
FIG. 4 is a more detailed block diagram illustrating an example decoder in accordance with a preferred embodiment of the present invention.

Referring to FIG. 4, a more detailed block diagram is shown illustrating an example implementation of the decoder 110 in FIG. 1. The decoder 110 generally comprises a block (or circuit) 170, a block (or circuit) 172, a block (or circuit) 174, and a block (or circuit) 176. The block 170 may be implemented as a demultiplexer. The block 174 may be implemented as an H.264 decoder. The block 172 may be implemented as a film grain simulator circuit. The block 176 may be implemented as an adder circuit.

The demultiplexer 170 generally receives the bitstream from the transmission medium 106. The demultiplexer 170 may present the signal COMPRESSED to the decoder 174 if the inserted watermark is dependent on the original video/audio generated from the source 150. The decoder 174 may present the SEI message on a signal (e.g., B) to the film grain simulator 172. The film grain simulator circuit 174 may generate film grain (e.g., which is representative of the watermark) on the signal FILM based on the values of the parameters in the message SEI generated by the encoder 154. The film grain simulator 172 generally presents film grain on a signal (e.g., FILM) to the adder circuit 176. The adder circuit 176 generally combines the film grain to the decompressed video to produce a video output on a signal (e.g., DECOMPRESSED). The watermark detection circuit 116 may receive the signal DECOMPRESSED to extract the watermark. The watermark detection circuit 116 may determine the watermark by estimating the intensity and the horizontal and vertical cut frequency of the film grain.

If the inserted watermark is independent of the original video/audio generated from the source 150, the demultiplexer 170 may present the signal SEI to the film grain simulator circuit 172. The film grain simulator circuit 174 may generate film grain on the signal FILM based on the values of the parameters SEI on message. The watermark detection circuit 116 may receive the signal FILM to extract the watermark. The watermark detection circuit 116 may be coupled to the outputs of the film grain simulator circuit 174 and the adder circuit 176. In one example, the watermark detection circuit 116 may detect the watermark using a combination of the output of the film grain simulator circuit 172 (e.g., via the signal FILM) and the output of the adder circuit 176 (e.g., via the signal DECOMPRESSED). CRC values may be checked to ensure that (i) the film grain is accurately represented and (ii) the film grain in the video complies with existing technology. In general, decoders may need to be checked by the video at the output of the film grain simulator circuit 172 and/or the output of the adder circuit 176 for the purpose of HD-DVD conformance checking. By detecting the watermark at the output of the watermark simulator circuit 172 and at the output of the adder circuit 176, watermark detection may take place with a minimum amount of changes to current hardware/architectures.

With film grain simulation, 13 different horizontal high cut frequencies and 13 different vertical high cut frequencies result in 169 unique film grain patterns. Adjacent cuts off values may result in extremely similar film grain appearance. A superior perceptual effect due to slightly increased randomness may be produced by modifying specific cutoffs in a pseudo-random fashion with film grain simulation to embed hidden information. In one example, 255 different film grain intensities may be used.

The watermark detection circuit 116 may extract the watermark from rendered/decompressed video stream (i) through the temporal and/or spatial characteristics of the film grain, (ii) by estimating the intensity and horizontal and vertical cut frequency of each frame, and detecting a signature pattern in the variation of these patterns, (iii) by estimating either the absolute or the relative frequency distribution of the film grain and the overall video signal, making the detection mechanism robust to attack, and/or (iv) by estimating the relative or absolute intensities of the film grain and the overall video signal.

The watermark detection circuit 116 may estimate the intensity and horizontal/vertical cutoff frequency of each frame and/or estimate the absolute or relative frequency distribution by various methods used for spectral estimation. These methods may include the classical periodogram, blackman-tukey, and/or a correlation method. More modern techniques of parametric modeling, autogressive and/or moving average estimation, and minimum variance estimation may also be used. Additionally, an ad hoc method may be used which may include a low-complexity approximation of one of the above mentioned techniques.

The watermark detection circuit 116 may also extract the film grain hidden information by (i) frequency filtering horizontally or vertically to change the horizontal and/or vertical cutoff frequencies of the film grain, (ii) modifying the intensity of the film grain of the combined video, the film grain video, or the underlying video without film grain, and/or (iii) removing the simulated film from the rendered/decompressed video. The present invention may involve synchronizing the rendered compressed video, and discover the underlying phase of the film grain insertion process, followed by removal of the simulated film grain.

Frequency filtering may modify the cutoff frequency by attenuating specific frequencies in the watermarked video stream. Frequency filtering may have the undesirable effect of attenuating frequencies both in the film grain and in the underlying video signal. Therefore, any attack should not be capable of significantly increasing the watermark error rate (e.g., decreasing the information rate of the watermark). If the cut-frequency signal levels are chosen to be separated sufficiently to cause such an attack, and to significantly degrade the visual quality of the video, a successful attack should remove the watermark or significantly reduce the watermark information rate without visible video degradation.

The underlying phase of the film grain may be linked to the picture order count (or picture display order) as defined in the H.264 standard. Without access to the bitstream syntax of the watermarked video, discovery of the underlying phase of the film grain can only be done with knowledge of the particular watermarking method that is generally in use. For example, a signature must be embedded into the watermark which enables the receiver to synchronize with the watermark (e.g., if a detection method uses synchronization). A typical example of a synchronization method may be a "start-code". With the start code, a particular extracted pattern of information by the watermark detector can be used to indicate a starting point in the video stream. The starting point may be used for the initialization or synchronization of the detector.

Conventional watermarking techniques try to attain minimum distortion of the original signal by remaining below the perception level of most observers. In one example, a conventional method of inserting a watermark in the LSBs of a video signal (or the transform coefficients of the video) is (i) severely hampered in terms of the amount of information that can be transmitted in the watermark and (ii) very fragile to an attack that involves removing or inserting noise into the LSBs of the video (i.e., on the transform coefficients of the video) to destroy the watermark without significantly impairing video quality. The present invention may provide a watermark that may be strong enough to be clearly visible to observers. The aim of the film grain (or the SEI message) is to simulate traditional film grain to give the video the look-and-feel of traditional cinematography.

The present invention may provide watermark signal power (e.g., in both the pixel and frequency domains) that may be an order of magnitude or more stronger than traditional watermarks, since the watermark is meant to be visible. Many conventional watermark attacks such as noise addition or removal, and/or recompression, may be much less effective against a watermark that is intended to be visible by users. The present invention may provide a strong deterrent to attacks since the strength of these attacks must be increased and be strong as to have an effect that is visible to an observer to be effective. In effect, the present invention provides visible watermarking techniques that are robust against attack. The present invention may provide the primary advantage of conventional invisible watermarking techniques, which is the insertion of the watermark that is not discernable to an observer. The present invention, generally overcomes a significant barrier that has, to date, hampered all watermarking techniques from becoming commercially successful. Invisible watermarks are strongly desired, but to date watermarks have been to vulnerable to the typical operations that users typically subject watermarks to (e.g., recompression, noise introduction, and/or cropping).

The present invention provides an extraction process that may be resistant to translation, rotation, scaling, and general affine skew by making the detection process relative to rendered video local or global orientation/scale/contrast/etc. In general, film grain is random in its appearance. Due to random appearance of film grain, there may be a great deal of latitude in how the film grain may be modified while still being visibly acceptable.

The present invention may also preserve the integrity of the hidden information through the encoding and decoding process. Digital video is generally only available in unencrypted form in the analog domain. Therefore, not only is the film grain syntax unassailable as long as the new cryptography of HD DVD remains secure. In general, the only domain in which the rendered film grain may be attacked is in the pixel domain. It is difficult to attack film grain in the pixel domain since completely removing all film grain may noticeably blur the video. In particular, high texture areas with irregular motion cannot normally be cleaned with motion compensated filtering. In general, the nature and characteristics of the film grain and any signature data or hidden information for watermarking is embedded in the film grain is robust against attack in the analog domain.

Since film grain may be extremely difficult to perfectly remove in the analog domain without damaging the underlying video, it will be extremely difficult to remove the embedded hidden information from the film grain. Removing grain is particularly difficult in the lower frequencies of the film grain. Also, modifying the intensity of the film grain relative to the intensity of the underlying video in highly textured video regions may be extremely difficult without modifying the underlying video. Due to the random nature of the film grain, it may be difficult to synchronize any rendered natural (non-test pattern) video to the underlying film grain patterns that are being used, and thereby determine the precise film grain in order to do perfect film grain extraction.

The present invention may provide (i) an extremely low-complexity watermark insertion process which includes lower complexity than alternative methods, (ii) a low-complexity extraction process, (iii) a secure and robust implementation for inserting and extracting watermarking that are comparable to existing techniques and (iv) a completely orthogonal method to existing methods. The present invention may be implemented in future and alternative video standards. For example, the present invention may be implemented with VC-1 in a similar manner once a syntax is specified for film grain.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    a first circuit configured to generate a bitstream, wherein said bitstream comprises (i) a video image signal and (ii) a traceable watermark message comprising signature data presented as one or more syntax elements in a film grain syntax format, wherein said syntax elements include a logarithmic scale factor;
    a second circuit configured to (i) simulate film grain in response to said syntax elements of said traceable watermark message and (ii) generate a video output signal containing (a) said video image signal and (b) said simulated film grain; and
    a watermark detection circuit configured to extract said signature data from said simulated film grain of said video output signal, wherein said signature data (i) is not directly discernable when said video signal is displayed and (ii) provides information about the creation of said bitstream.

2. The apparatus according to claim 1, wherein said first circuit further comprises a watermark generator configured to generate said signature data.

3. The apparatus according to claim 1, wherein said first circuit further comprises a film grain modeler configured to generate said traceable watermark message in response to varying one or more predetermined values based on said signature data if said signature data is independent of original video data.

4. The apparatus according to claim 3, wherein said film grain modeler varies (i) a logarithmic scale factor, (ii) a film grain intensity, (iii) a horizontal high cut-off frequency and (iv) a vertical high cut-off frequency.

5. The apparatus according to claim 4, wherein said bitstream further comprises compressed original video data having original film grain.

6. The apparatus according to claim 5, wherein said first circuit further comprises an encoder configured to (i) vary one or more predetermined values of said traceable watermark message based on said signature data, (ii) estimate said original film grain from said original video data, and (iii) remove said original film grain if said signature data is dependent on said original video data.

7. The apparatus according to claim 6, wherein said encoder varies (i) a logarithmic scale factor, (ii) a film grain intensity, (iii) a horizontal high cutoff frequency and (iv) a vertical high cutoff frequency.

8. The apparatus according to claim 7, wherein said second circuit further comprises a film grain simulation circuit configured to generate film grain in response to said traceable watermark message.

9. The apparatus according to claim 8, wherein said watermark detection circuit is coupled to said film grain simulation circuit and extracts said signature data from said traceable watermark message when said signature data is independent of said original video data by estimating (i) intensity, (ii) a horizontal cutoff frequency, and (iii) a vertical cutoff frequency for each frame.

10. The apparatus according to claim 9, wherein said watermark detection circuit is coupled to an adder circuit and extracts said signature data from a decompressed signal when said signature data is dependent on original video data by estimating (i) intensity, (ii) a horizontal cut-off frequency, and (iii) a vertical cut-off frequency for each frame.

11. The apparatus according to claim 10, wherein said watermark detection circuit presents (i) said signature data on a first output and (ii) said video image signal on a second output.

12. The apparatus according to claim 1, wherein said first circuit (i) embeds said signature data based on temporal or spatial characteristics of film grain, (ii) manipulates film grain intensity and film grain pattern, (iii) embeds said signature data in syntax elements of said traceable watermark message and (iv) manipulates said syntax elements on a picture or at a multiple of picture frequencies.

13. The apparatus according to claim 1, wherein said watermark detection circuit extracts said signature data by detecting a predetermined signature pattern through a variation of signature patterns.

14. The apparatus according to claim 1, wherein said watermark detection circuit extracts said signature data by estimating an absolute frequency distribution or a relative frequency distribution of film grain and a decompressed video.

15. The apparatus according to claim 1, wherein said watermark detection circuit extracts said signature data by estimating either a relative intensity or an absolute intensity of film grain and a decompressed video.

16. A method for video watermarking using simulated film grain, comprising the steps of:
    (A) generating a bitstream using an encoder, wherein said bitstream comprises (i) a video image signal and (ii) a traceable watermark message comprising signature data presented as one or more syntax elements in a film grain syntax format, wherein said syntax elements include a logarithmic scale factor;
    (B) simulating film grain in response to said syntax elements of said traceable watermark message and generating a video output signal containing (i) said video image signal and (ii) said simulated film grain;
    (C) generating a video output; and
    (D) extracting said signature data from said simulated film grain of said video output signal using a decoder, wherein said signature data (i) is not directly discernable when said video signal is displayed and (ii) provides information about the creation of said bitstream.

17. The method according to claim 16, wherein step (D) further comprises the step of:
    frequency filtering to change one of the horizontal or vertical cut-off frequencies of the film grain.

18. The method according to claim 16, wherein step (D) further comprises the step of:
- modifying an intensity of the film grain of a first decompressed video signal, wherein said first decompressed video signal comprises original video data and original film grain generated with said original video data; and
- modifying an intensity of the film grain of a second decompressed video signal, wherein said second decompressed video signal comprises original video data.

19. The method according to claim 16, wherein step (A) further comprises the step of:
- discovering an underlying phase of a film grain insertion process; and
- removing simulated film grain.

20. An apparatus comprising:
- means for generating a bitstream, wherein said bitstream comprises (i) a video image signal and (ii) a traceable watermark message comprising signature data presented as one or more syntax elements in a film grain syntax format, wherein said syntax elements include a logarithmic scale factor;
- means for simulating film grain in response to said syntax elements of said traceable watermark message and generating a video output signal containing (i) said video image signal and (ii) said simulated film grain;
- means for generating a video output; and
- means for extracting said signature data from said simulated film grain of said video output signal, wherein said signature data (i) is not directly discernable when said video signal is displayed and (ii) provides information about the creation of said bitstream.

21. The apparatus according to claim 1, wherein said watermark detection circuit is further configured to identify a pirated copy.

22. The apparatus according to claim 21, wherein said watermark detection circuit is further configured to identify a device and playback session from said pirated copy.

23. The apparatus according to claim 1, wherein said traceable watermark message further comprises hidden information.

24. The apparatus according to claim 1, wherein said traceable watermark message simulates film grain.

25. The apparatus according to claim 1, wherein said simulated film grain is resistant to (i) translation, (ii) rotation, (iii) scaling and (iv) affine skew.

26. The apparatus according to claim 1, wherein said signature data is robust against attack in an analog domain.

27. The apparatus according to claim 1, wherein said information includes an address where said bitstream was created.

28. The apparatus according to claim 1, wherein said information includes a date when said bitstream was created.

* * * * *